(12) United States Patent  
Patel et al.

(10) Patent No.: US 7,126,913 B1
(45) Date of Patent: *Oct. 24, 2006

(54) METHOD AND SYSTEM FOR MANAGING TRANSMISSION RESOURCES IN A WIRELESS COMMUNICATIONS NETWORK

(75) Inventors: Achal R. Patel, McKinney, TX (US); Pulin R. Patel, McKinney, TX (US); Ojas T. Choksi, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 10/309,393

(22) Filed: Dec. 3, 2002

Related U.S. Application Data (63) Continuation of application No. 09/513,913, filed on Feb. 25, 2000, now Pat. No. 6,522,628.

(60) Provisional application No. 60/122,012, filed on Mar. 1, 1999.

(51) Int. Cl.
*H04J 3/14* (2006.01)
*H04L 12/66* (2006.01)

(52) U.S. Cl. ............. 370/230.1; 370/232; 370/235

(58) Field of Classification Search ........... 370/230, 370/230.1, 235, 235.1, 252, 332, 329, 348, 370/465
See application file for complete search history.

(56) References Cited

U.S. PATENT DOCUMENTS

| | | | |
|---|---|---|---|
| 5,257,283 A | 10/1993 | Gilhousen et al. | 375/1 |
| 5,293,640 A | 3/1994 | Gunmar et al. | 455/33.1 |
| 5,390,165 A * | 2/1995 | Tuch | 370/252 |
| 5,561,839 A | 10/1996 | Osterberg et al. | 455/33.1 |
| 5,603,085 A | 2/1997 | Shedlo | 455/33.1 |
| 5,666,356 A | 9/1997 | Fleming et al. | 370/328 |
| 5,734,967 A | 3/1998 | Kotzin et al. | 455/63 |
| 5,745,480 A | 4/1998 | Behtash et al. | 370/252 |
| 5,768,260 A | 6/1998 | Lindgren et al. | 370/252 |
| 5,805,585 A | 9/1998 | Javitt et al. | 370/342 |
| 5,862,485 A | 1/1999 | Linneweh, Jr. et al. | 455/450 |
| 5,923,650 A * | 7/1999 | Chen et al. | 370/331 |
| 5,987,326 A | 11/1999 | Tiedemann, Jr. et al. | 455/442 |
| 5,995,805 A | 11/1999 | Ogasawara et al. | 455/13.1 |
| 6,021,309 A | 2/2000 | Sherman et al. | 455/12.1 |
| 6,070,084 A | 5/2000 | Hamabe | 455/522 |
| 6,157,668 A | 12/2000 | Gilhousen et al. | 375/130 |

(Continued)

FOREIGN PATENT DOCUMENTS

EP      0 831 669 A2    3/1998

(Continued)

OTHER PUBLICATIONS

Timothy Ju and Gary Ogasawara, "Congestion Control By Traffic Shaping for Ground//Satellite Network," XP-002140800, *Milcom '97 Proceedings*, Nov. 2-5, 1997, pp. 1318-1322.

(Continued)

*Primary Examiner*—Doris H. To
*Assistant Examiner*—Soon D. Hyun
(74) *Attorney, Agent, or Firm*—Baker Botts L.L.P.

(57) ABSTRACT

A method and system for managing transmission resources in a wireless communications network includes receiving a plurality of packets and determining a time duration for transmission of each packet. A power level for transmission of each packet over the time duration is further determined. Based on the time duration and the power level determined for each packet, a wireless resource impact is determined for each packet. Transmission resources are allocated to each packet based on the wireless resource impact determined for each packet.

22 Claims, 9 Drawing Sheets

U.S. PATENT DOCUMENTS

| | | | |
|---|---|---|---|
| 6,181,738 B1 | 1/2001 | Chheda et al. | 375/224 |
| 6,219,343 B1* | 4/2001 | Honkasalo et al. | 370/335 |
| 6,226,283 B1 | 5/2001 | Neumiller et al. | 370/340 |
| 6,289,005 B1 | 9/2001 | Katz | 370/328 |
| 6,304,562 B1 | 10/2001 | Kim et al. | 370/332 |
| 6,327,254 B1 | 12/2001 | Chuah | 370/328 |
| 6,418,148 B1* | 7/2002 | Kumar et al. | 370/468 |
| 6,456,605 B1* | 9/2002 | Laakso et al. | 370/330 |
| 6,775,548 B1* | 8/2004 | Rong et al. | 370/468 |

FOREIGN PATENT DOCUMENTS

| | | |
|---|---|---|
| EP | 0 841 763 A1 | 5/1998 |
| EP | 1 041 850 A1 | 10/2000 |
| WO | WO 98/45966 | 10/1998 |
| WO | WO 98/52288 | 11/1998 |
| WO | WO 99/53630 | 10/1999 |

OTHER PUBLICATIONS

*Data Networks*, Bertsekas et al., 1987.

"On the Capacity of a Cellular CDMA System," Gilhousen et al., *IEEE* 1991, 10 pages.

"Erlang Capacity of a Power Controlled CDMA System," Viterbi et al., *IEEE* 1993, 9 pages.

U.S. Appl. No. 09/174,273, entitled "Method and Apparatus for Class Based Transmission Control of Data Connections Based on Real-Time External Feedback Estimates Obtained Using Messaging from a Wireless Network," filed Oct. 16, 1998, 35 pages. (062891.0476), Oct. 18, 1998.

S.Biaz and N. Vaidya, "Discriminating Congestion Losses from Wireless Losses using Inter-Arrival Times at the Receiver," IEEE Symposium Application-Specific Systems and Software Engineering Technology (ASSET), 8 pages, Mar. 1999.

G. Holland and N.H. Vaidya, "Analysis of TCP Performance over Mobile Ad Hoc Networks," Fifth Annual ACM/IEEE International Conference on Mobile Computing and Networking (MOBICOM), 13 pages, Aug. 1999.

G. Holland and N.H. Vaidya, "Impact of Routing and Link Layers on TCP Performance in Mobile Ad Hoc Networks," IEEE Wireless Communications and Networking Conference (WCNC), 5 pages, Oct. 1999.

U.S. Appl. No. 09/466,308, entitled "Method and System for Allocating Bandwidth in a Wireless Communications Network," filed Dec. 17, 1999, 85 pages. (062891.0475).

B. Bakshi, et al., "Improving Performance of TCP over Wireless Networks," IEEE 17th International Conference on Distributed Computing Systems, 10 pages, May 1997.

U.S. Appl. No. 09/513,914, entitled "Wireless Router and Method for Processing Traffic in a Wireless Communications Network," filed Feb. 25, 2000, 87 pages. (062891.0479).

U.S. Appl. No. 09/513,090, entitled "Method and System for Configuring Wireless Routers and Networks," filed Feb. 25, 2000, 94 pages. (062891.0481).

U.S. Appl. No. 09/513,592, entitled "Method and System for Brokering Bandwidth in a Wireless Communications Network," filed Feb. 25, 2000, 50 pages. (062891.0478).

U.S. Appl. No. 09/513,912, entitled "Method and System for Queuing Traffic in a Wireless Communications Network," filed Feb. 25, 2000, 94 pages. (062891.0477).

CA*net II Differentiated Services. Bandwidth Broker System Specification, British Columbia Insitute of Technology, Technology Centre, Group for Advanced Information Technology, http://www.interrnet2.edu/qos/gbone/QB BAC.shtml, Online Oct. 4, 1998, XP-002136418, 13 pages, Printed Apr. 25, 2000.

U.S. Appl. No. 09/591,077, entitled "Method and System for Dynamic Soft Handoff Resource Allocation in a Wireless Network," filed Jun. 9, 2000, 66 pages. (062891.0473).

U.S. Appl. No. 09/908,225, entitled "Method and System of Integrated Rate Control for a Traffic Flow Across Wireline and Wireless Networks," filed Jul. 18, 2001, 32 pages. (062891.0480).

"TCP and Explicit Congestion Notification," Floyd, Lawrence Berkeley Laboratory, DE-AC03-76SF00098, 16 pages.

* cited by examiner

METHOD AND SYSTEM FOR MANAGING TRANSMISSION RESOURCES IN A WIRELESS COMMUNICATIONS NETWORK

CROSS REFERENCE TO RELATED APPLICATION

This application is a continuation of U.S. application Ser. No. 09/513,913 filed Feb. 25, 2000 now U.S. Pat. No. 6,522,628 and entitled "Method and System for Managing Transmission Resources in a Wireless Communications Network" which claims the benefit of U.S. Patent Application Ser. No. 60/122,012 entitled "Method and Apparatus for Policing, Shaping, and Controlling Bandwidth in a Wireless Multi-media Network" filed on Mar. 1, 1999.

This application is related to U.S. patent application Ser. No. 09/513,912 entitled "Method and System for Queuing Traffic in a Wireless Communications Network," U.S. patent application Ser. No. 09/513,592 entitled "Method and System for Brokering Bandwidth in a Wireless Communications Network," U.S. patent application Ser. No. 09/513,914 entitled "Wireless Router and Method for Processing Traffic in a Wireless Communications Network," and U.S. patent application Ser. No. 09/513,090 entitled "Method and System for Configuring Wireless Routers and Networks," all filed on Feb. 25, 2000 and incorporated herein by reference.

TECHNICAL FIELD OF THE INVENTION

The present invention relates generally to the field of wireless communications, and more particularly to an improved method and system for managing transmission resources in a wireless communications network.

BACKGROUND OF THE INVENTION

Wireline and wireless Internet protocol (IP) networks have traditionally supported a best effort delivery of all traffic. To support enhanced services, multiple types, or classes, of services have been established and assigned certain quality of service (QoS)

parameters that manage queues for each service type. The QoS parameters include delay, jitter, error rates, and throughput. The QoS parameters can be provisioned on a per IP connection or per flow basis through mechanisms such as resource reservation protocol (RSVP) or can be provisioned on aggregate flow which are classified into service classes. Internet service providers (ISPs) can utilize the service classes, their associate QoS behavior and QoS provisioning to provide multiple service offerings to their business and consumer customers.

The IP-QoS architecture provides congestion control tools that work closely with traffic shaping, admission control and coordinated policing tools to control and shape the traffic of various IP flows and to insure QoS behavior for each class of service. The goal of congestion control is to adapt the sending rate of data at its source to match the bandwidth available at a network node. Thus, as the bandwidth availability or the demand for bandwidth changes in a network, the data sources are controlled to adapt their sending rate to the bandwidth changes.

Traffic shaping and policing are performed at the network nodes. Traffic shaping is typically implemented using a token, or leaky bucket. The token bucket is sized in accordance with a burst rate of the traffic and is filled with tokens at a long-term average rate of the available supply or bandwidth. Traffic is policed by requiring packets to checkout tokens from the bucket for transmission.

To support flows having disparate QoS parameters, multiple token buckets have been used in a network node to police and control the disparate QoS flows. Each token bucket is sized and configured at a rate corresponding to the QoS parameters of an associated flow. While the use of multiple token buckets supports disparate flow types, the token buckets are not sensitive to the characteristics of the radio frequency (RF) wireless environment in which different flow types have different impact on the media/physical layer and have a different interference impact based on location of the flow.

SUMMARY OF THE INVENTION

The present invention provides an improved method and system for managing transmission resources in a wireless communications network that substantially eliminate or reduce problems and disadvantages associated with previous methods and systems. In particular, transmission power usage and/or inter geo-location interference are taken into account in allocating transmission resources in a wireless network in order to effectively police, shape and control traffic flows.

In accordance with one embodiment of the present invention, a method and system for managing transmission resources in a wireless communications network includes receiving a plurality of internet protocol (IP) or other data packets. A duration time for transmission of each packet is determined. A power level for transmission of each packet over the time duration is also determined. A wireless resource impact is determined for each packet based on the time duration and the power level determined for each packet. Transmission resources are allocated to each packet based on the wireless resource impact determined for each packet.

More specifically, in accordance with a particular embodiment of the present invention, the wireless resource impact determined for each packet is a sector impact representing the impact of transmitting the packet in a sector of the wireless network. In this embodiment, a geographic interference impact of transmitting the packet in the sector is determined for a neighboring or other sector based on the sector impact. A network impact is determined based on and accounts for the sector impact and the geographic interference impact. Transmission resources are allocated based on the network impact determined for each packet.

In accordance with another aspect of the present invention, a method and system for managing transmission resources in a wireless communications network includes receiving a packet and providing a token bucket comprising a plurality of tokens representing power available for transmission of the packet. A transmission token is generated representing a time duration for transmission of the packet and a power level for transmission of the packet over the time duration. The sufficiency of available tokens in the token bucket for the transmission token is determined and the packet transmitted if sufficient tokens are available.

Technical advantages of the present invention include providing an improved method and system for managing transmission resources in a wireless communications network. In particular, the varying impact of transmitting data packets on a wireless physical layer is accounted for in allocating queuing, forwarding and other transmission resources in the wireless network. The varying impact may be determined based on the time, power, and geo location constraints of the packet on the physical layer. Thus, conflicts between calls or other types of flows and the resulting excessive interference impact within the system due to over allocation are minimized.

Another technical, advantage of the present invention includes providing an improved multi-media wireless network. In particular, the network employs a multi-dimensional allocation system that allows multiple users and multiple services types with differing bandwidth requirements to use a shared wireless transmission resource without conflict. The multiple service types may be different quality of service (QoS) classes such as premium, assured, and best effort.

Yet another technical advantage of the present invention includes providing an improved method and system for controlling, shaping, and policing data flows in a wireless network. In particular, the full impact of packet transmission on the wireless network is evaluated in allocating bandwidth resources. As a result, traffic flows may be more accurately policed and shaped to account for limitations of the wireless system.

Yet another technical advantage of the present invention includes providing a method and system to account for the specific impact of each data packet on the physical layer resource in a wireless network. In particular, transmission power for the packet is taken into account when evaluating the impact of packet transmission in a cell site or other location of the wireless network. In addition, impact on neighboring and other cell sites is also accounted for to conform the packet to specific physical layer traffic characteristics of the network.

Still another technical advantage of the present invention includes providing a multiple dimension token and token bucket for allocating resources in a wireless network. In particular, each packet may be represented by a transmission token specifying packet transmission time in a first dimension, transmission power in a second dimension, and interference impact on neighboring and other cell sites in a third dimension. This multi-dimensional token fully accounts for the impact of the packet on the physical wireless system. In addition, the multiple dimension token bucket may be filled at a static or dynamic rate based on system loading or available bandwidth.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
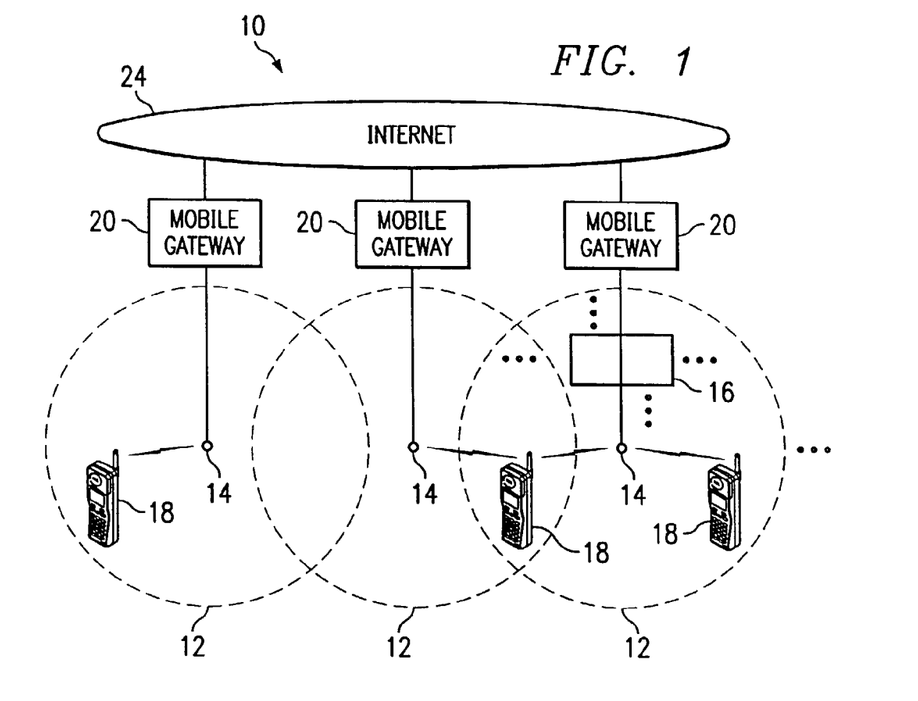
FIG. 1 is a block diagram illustrating a wireless network in accordance with one embodiment of the present invention.

FIG. 1 illustrates a wireless network 10 in accordance with one embodiment of the present invention. In this embodiment, the wireless network 10 is a cellular network in which terrestrial wireless transmission originates in geographically delimited cells. It will be understood that the present invention may be used in connection with satellite and other suitable wireless and other dynamic bandwidth networks.

Referring to FIG. 1, the wireless network 10 covers a contiguous area that is broken down into a series of overlapping cells 12. Each cell 12 has a base station, or server, 14 and may be subdivided into a plurality of geo-location areas 16. The geo-location areas 16 are each a defined area in which bandwidth may be allocated to mobile devices. The geo-location areas 16 may have a resolution greater than, less than, or equal to cell size. In a particular embodiment, the geo-location areas 16 are substantially square in shape to form a contiguous grid over the coverage area. Thus, the geo-locations 16 may be shared by one or more cells 12. Further information regarding the geo-location and allocation of bandwidth in the geo-locations is described in co-owned U.S. patent application Ser. No. 09/466,308, titled Method and System for Allocating Bandwidth in a Wireless Communications Network, filed Dec. 17, 1999, and incorporated herein by reference.

Each server 14 provides a radio frequency (RF) link for mobile devices 18 within its cell 12. The wireless RF link to the mobile devices 18 in the cell 12 may be based on established standard such as IS-54 (TDMA), IS-95 (CDMA), GMS and AMPS, 802.11 based WLAN, or new upcoming standards such as CDMA 2000 and W-CDMA or proprietary radio interfaces. The mobile devices may be cell phones, data phones, data devices, portable computers, or any other suitable device capable of communicating information over a wireless link. Due to the nature of the RF airlink, the interference generated by the usage of various mobile devices 18 is inter-dependent. That is, the interference generated by the usage of a mobile device 18 including transmitting and receiving signals is not only dependent on its geo-location, but is also dependent on the geo-location of surrounding mobile devices 18 and the usage of those devices. Thus, the cellular network is an inherently interference-limited network with bandwidth usage in a particular location impacting the interference in specific areas of the neighborhood. In the complete spectrum sharing systems such as CDMA and W-CDMA, bandwidth usage in a particular area directly impacts the bandwidth available at different locations in the neighborhood. The servers 14 each have a defined bandwidth with which to communicate with the mobile devices 18 in the cells 12. The bandwidth is used by the server 14 and the mobile devices 18 to communicate voice and data information. The supported bandwidth is a function of various factors such as frequency reuse, carrier to interface ratio, bit-energy to noise ratio, effective bit-rate per connection and the like. As described in more detail below, the bandwidth available to allocate to certain flows is geo-location dependent, and time dependent based on current usage of other flows in the geo-neighborhood.

The servers 14 are each connected to a mobile gateway 20 that allocates bandwidth within the wireless network 10, routes traffic, and tracts the location of the mobile devices 18 in the cells 12. The position of a mobile device 18 may be determined using network-assist, global position systems (GPS) and radio frequency fingerprinting. Preferably, the positioning technique provides fast and accurate information with respect to the location of the mobile device 18 to minimize acquisition time for position information. As mobile users move from cell 12 to cell 12, a hand-off operation between base stations 14 is performed by the mobile gateway 20.

The mobile gateway 20 provides connectivity from the wireless portion of the network 10 to a wireline portion 24 of the network 10 via circuit switched and packet switch wireless data protocols. The wireline portion 24 may be the Internet, intranet, extranet, or other suitable local or wide area network. For the Internet, the mobile gateway 20 provides an access, or entry point for all transport control protocol/Internet protocol (TCP/IP) data connections to the wireless portion of the network 10. Each mobile gateway 20 may serve one or more servers 14, include the RF front end and other functionality of a server 14, and/or may be wireless router as described in co-owned U.S. patent application Wireless Router and Method for Processing Traffic in a Wireless Communications Network previously incorporated by reference. In the later case, the wireless router may be self-configuring as described in co-owned U.S. patent application Method and System for Configuring Wireless Routers and Networks also previously incorporated by reference. Bandwidth allocation and other functionality of the mobile gateways 20 may instead be implemented by a mobile switching center (MSC), data interworking function (IWF) devices, and other suitable network devices without departing from the scope of the present invention.

Figure 2:
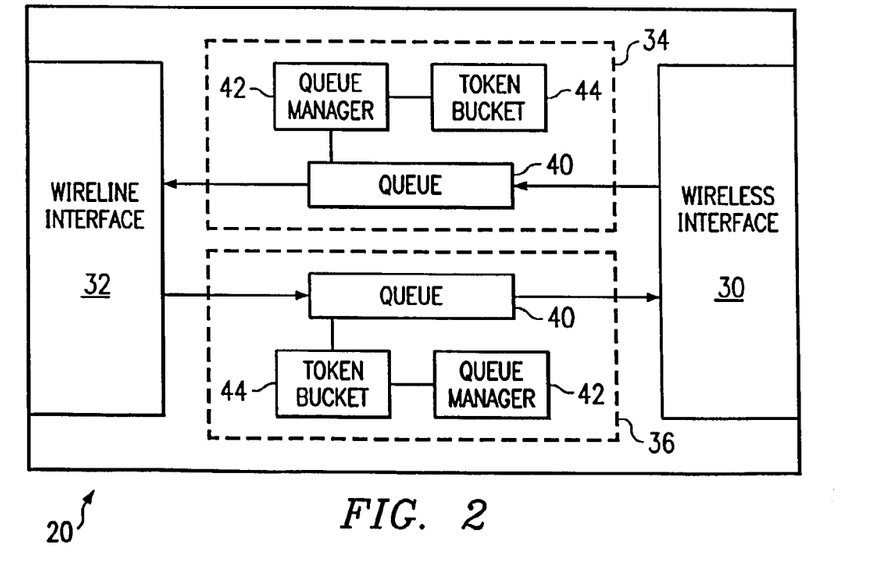
FIG. 2 is a block diagram illustrating details of the mobile gateway of FIG. 1 in accordance with one embodiment of the present invention.

FIG. 2 illustrates details of the mobile gateway 20 in accordance with one embodiment of the present invention. In this embodiment, the mobile gateway 20 includes local queuing and queue management functionality for processing traffic in the wireless network 10. It will be understood that the queue and queue management functionality of the mobile gateway 20 may be suitably distributed within the wireless network 10. In a particular embodiment, the queuing and queue management functionality may be separately implemented for each of a plurality of virtual groups as described in co-owned U.S. Application Method and System for Queuing Traffic in a Wireless Communication Network previously incorporated by reference.

Referring to FIG. 2, the mobile gateway 20 includes a wireless interface 30, a wireline interface 32, an ingress transmission control system 34, and an egress transmission control system 36. The wireless interface 30 includes a transceiver or other suitable system for communicating RF signals with mobile devices 18 in the network 10. The wireline interface 32 comprises a conventional or other suitable interface for communicating traffic with the wireline portion of the network 10. The interfaces 30 and 32 may also be remote from the mobile gateway 20.

As described in more detail below, the ingress and egress transmission control systems 34 and 36 each account for the varying impact of packet transmissions and/or the system loading on the physical layer in allocating transmission resources in the network 10. As a result, conflicts between calls due to over allocation are minimized. The ingress and egress transmission control systems 34 and 36 may each be implemented in hardware, software stored in a computer-readable medium, and/or a combination of hardware and software. The hardware may comprise a field programmable gate array (FPGA) programmed to perform the functionality of the transmission control systems 34 and 36, an application specific integrated circuit (ASIC) designed to perform the functionality of the transmission control systems 34 and 36, and/or a general purpose processor programmed by software instructions to perform the functionality of the transmission control systems 34 and 36. Thus, in particular embodiments, transmission control systems 34 and 36 may include software, or other computer implementable instructions, operable upon processing to receive a data packet and to control transmission of the data packet based on a time of transmission, a power of transmission, and a location of transmission.

In one embodiment, the ingress and egress transmission control systems 34 and 36 each include a queue 40, a queue manager 42, and a multiple dimension token bucket 44. Packets received by the wireless interface 30 are checked-in to the ingress queue 40 from which they are checked-out by the ingress queue manager 42 as transmission resources become available. The packets may each be a packetized or other suitable signal transmitted or received in discrete units. Each means every one of at least a subset of the identified items. As the ingress packets are checked-out of the ingress queue 40, they are passed to the wireline interface 32 for transmission in the wireline portion 24 of the network 10. Similarly, egress packets received by the wireline interface 32 are checked-in to the egress queue 40 from which they are checked-out by the egress queue manager 42 as transmission resources become available. As the egress packets are checked-out by the egress queue manager 42, they are passed to the wireless interface 30 for transmission in the wireless portion of the network 10. In this way, the ingress and egress queue managers 42 together control traffic transmitted from and to the mobile devices 18 in an associated sector 12 of the network 10.

The multiple dimension token buckets 44 provide the available impact level and/or supply bandwidth for packet transmissions in the associated sector 12 at each unit in time. In particular, the ingress token bucket 44 is sized in accordance with transmission resources available for the mobile devices 18 in the sector 12. Similarly, the egress token bucket 44 is sized in accordance with reception resources available for the mobile devices 18. Available resources in the transmit and receive directions will vary depending on the size of the sectors 12, the various access technologies deployed in the sectors 12 system loading parameters, type of flows in the geo-neighborhood and other suitable operating parameters of the system.

To support multiple service levels, multi-media, and customer groups, packet flows in the mobile gateway 20 may be organized into a plurality of discrete groups. In this case, a separate set of multiple dimension token buckets 44 may be used to police and control flows in each group. As used herein, each means everyone of at least a subset of the identified items. Available resources in the sector 12 are statically or dynamically allocated between the groups. Each set of the multiple dimension token buckets 44 is sized in accordance with the resources allocated to the group. Further information regarding the organization of flows into groups and the disparate treatment of groups is described in co-owned U.S. patent application entitled "Method and System for Queuing Traffic in a Wireless Communications Network", which has been previously incorporated by reference.

Figures 3, 7:
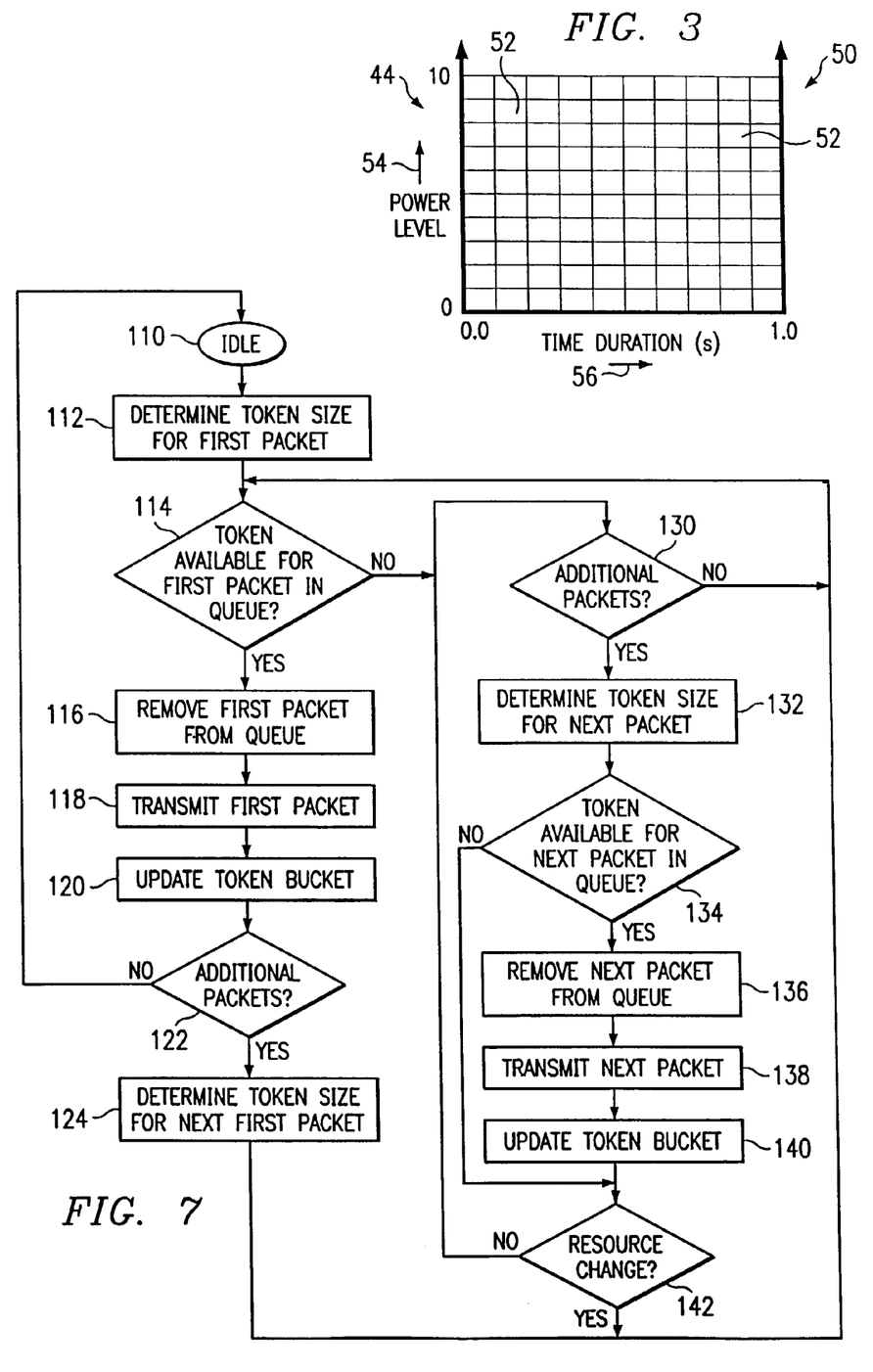
FIG. 3 is a block diagram illustrating the multiple dimension token bucket of FIG. 2 in accordance with one embodiment of the present invention.
FIG. 7 is a flow diagram illustrating a method for packet check-out from the queue of FIG. 2 using the multiple dimension token and token bucket of FIGS. 3 and 5 in accordance with one embodiment of the present invention.

FIG. 3 illustrates the multiple dimension token bucket 44 in accordance with one embodiment of the present invention. In this embodiment, the multiple dimension token bucket 44 is a two-dimensional token bucket 50. The token buckets 44 and 50 are implemented in software, ASIC, FPGA, or other suitable processor. It will be understood that the multiple dimension token bucket 44 may include additional dimensions to conform a flow or aggregation of flows to specific physical layer characteristics of the wireless network 10.

Referring to FIG. 3, the two-dimensional token bucket 50 comprises a plurality of two-dimensional tokens 52. The two-dimensional token bucket 50 is sized based on the average data rate, burst rate, transmission power, interference characteristics, or other suitable parameters of a corresponding flow, group of flows or location.

The two-dimensional token bucket 50 is updated for each unit of time to account for the token fill rate and the token use rate. Tokens are filled at a static or dynamic rate per unit time based on defined parameters such as historical data, system loading, available bandwidth, and system interference. The token use rate is dependent on transmission activity. Thus, some or all of the tokens may be used for each unit time. Further information regarding filling of the token bucket 50 is described in more detail below in connection with FIG. 4. Further information regarding use of tokens from the token bucket 50 is described in more detail below in connection with FIGS. 7–8.

In one embodiment, the two-dimensional token bucket 50 represents power level 54 as depth of the bucket 50 and time duration 56 as width of the bucket 50. In this embodiment, each token 52 represents impact on RF resources of transmitting or receiving a packet at one power level unit per unit time. The power and time units are units based or associated directly or indirectly with transmission power and duration, respectively. In a particular embodiment, the power level unit is one watt and the time unit is one-tenth of a second. It will be understood that the two-dimensional token bucket 50 may comprise other suitable units that represent impact of a transmission on RF resources.

Figure 4:
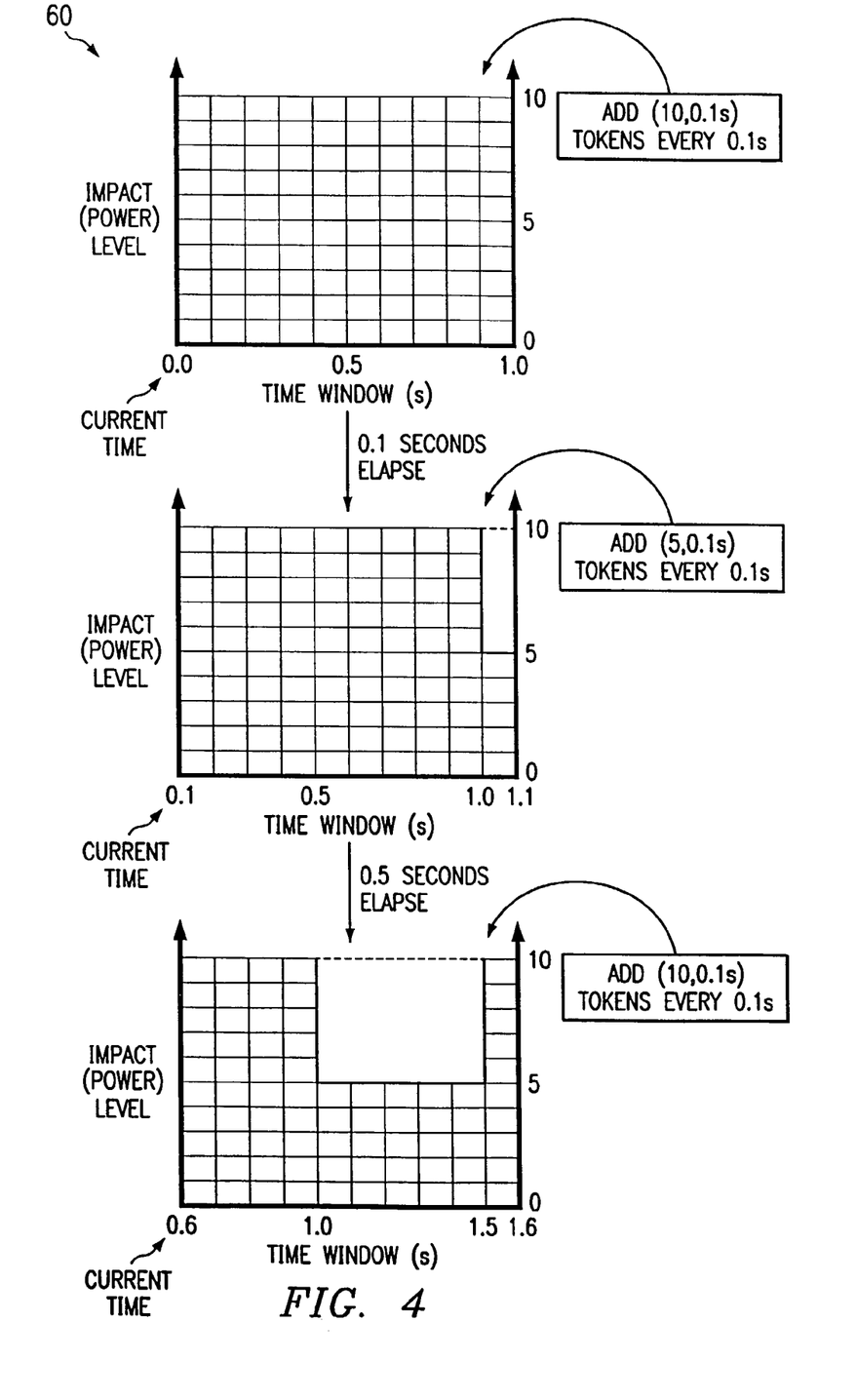
FIG. 4 is a block diagram illustrating filling of an exemplary multiple dimension token bucket in accordance with one embodiment of the present invention.

FIG. 4 illustrates filling of an exemplary token bucket 60 in accordance with one embodiment of the present invention. In this embodiment, the exemplary token bucket 60 is a two-dimensional token bucket as previously described in connection with FIG. 3. The token bucket 60 is filled during each unit time at a variable rate in accordance with defined parameters which are based on real-time and other dynamic parameters of the network 10. The real-time and variable parameters may include system loading, system interference, call statistics, and soft handoff percentages.

Referring to FIG. 4, ten tokens are added at each 0.1 second time interval (100 milliseconds) for the first ten time intervals. In response to changing conditions in the network 10, five tokens are added at each of the next five time intervals between time 1.0 and time 1.5. Starting at time 1.5, due to again changing conditions in the network 10, the full ten tokens are added at the next time interval. During the reduced fill rate interval, the queue manager 42 will be forced to check-out and transmit a reduced rate and/or size of packets. In this way, bandwidth between flow groups may be dynamically re-allocated based on available resources within the access network.

Figure 5:
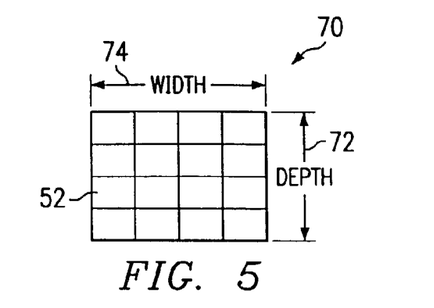
FIG. 5 is a block diagram illustrating a multiple dimension token for use in conjunction with the multiple dimension token bucket of FIG. 3 in accordance with one embodiment of the present invention.

FIG. 5 illustrates a two-dimensional transmission token 70 for packets for use in connection with the two-dimensional token bucket 50. The two-dimensional transmission token 70 comprises a token depth 72 and a token width 74 together defining a number and configuration of tokens 52 (area of transmission token 50) needed for transmission of a corresponding packet. The token depth 72 indicates the impact of power usage for transmission of the corresponding packet. The token width 74 indicates the duration of the impact. Thus, the full impact of transmitting the packet is represented by the transmission token 70 to allow full resource allocation for transmission of the packet. It will be understood that transmission tokens may be otherwise suitably configured to correspond to the multiple dimension token bucket 44.

Figure 6:
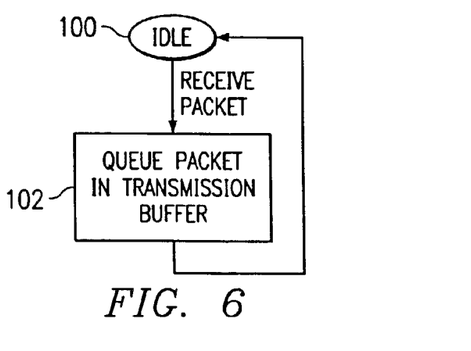
FIG. 6 is a flow diagram illustrating a method for packet check-in at the queue of FIG. 2 in accordance with one embodiment of the present invention.

FIG. 6 is a flow diagram illustrating a method for checking-in packets to the queue 40 in accordance with one embodiment of the present invention. In this embodiment, packets are queued in the order in which they are received. Congestion control may be applied prior to queuing as described in co-owned U.S. patent application entitled Method and System for Queuing Traffic in a Wireless Communications Network previously incorporated by reference.

Referring to FIG. 6, the method begins with the queue manager 42 in an Idle state 100 while no packets are being received by the wireless or wireline interface 30 or 32. In response to receiving a packet, the queue manager 42 transitions from the Idle state 100 to step 102. An action is in response to an event when it directly or indirectly follows from the event. Thus, one or more steps may intervene and/or be necessary for the action to occur. At step 102, the packet is queued at the tail end of the queue 40. Step 102 returns to state 100 in which the queue manager 42 awaits receipt of additional packets. Thus, the queue manager 42 will continuously queue packets in a first-in first-out (FIFO) order. It will be understood that incoming packets may be otherwise suitably queued in the mobile gateway 20 while awaiting transmission to a destination device.

FIG. 7 is a flow diagram illustrating the method for checking-out packets from the queue 40 using the multiple dimension token bucket 44 in accordance with one embodiment of the present invention. In this embodiment, the token bucket is a two-dimensional token bucket 50 and packets are represented by two-dimensional tokens 70. As described in more detail below, packets are checked-out in the order in which they are received in accordance with available resources. Thus, if available resources do not exist to transmit a first packet in the queue 40, later queued packets for which sufficient resources are available will be transmitted to maximize use of available resources.

Referring to FIG. 7, the method begins with the queue manager 42 in the Idle state 110 while the queue 40 is empty. In response to the queuing of one or more packets, the queue manager 42 transitions to step 112. At step 112, the queue manager 42 determines a size of a transmission token 70 for the first queued packet. As previously described, the transmission token 70 includes one or more tokens 52 and represents the full impact of transmitting the packet in the sector 12.

Proceeding to decisional step 114, the queue manager 42 determines whether sufficient tokens 52 are available in the token bucket 50 for transmission of the first packet based on the size of the transmission token 70. In one embodiment, sufficient tokens 52 are available in the token bucket 50 when a set of tokens 52 spanning the power level are available over the duration of the transmission time. If sufficient tokens 52 are available in the token bucket 50, the tokens 52 are allocated to the first packet and the Yes branch of decisional step 114 leads to step 116. At step 116, the first packet is removed from the queue 40. Next, at step 118, the first packet is transmitted to the wireless or wireline portion of the network 10 for delivery to a destination device. At step 120, the token bucket 50 is updated to remove the tokens 52 allocated to the packet as that bandwidth and power (impact) has been used and is no longer available.

Proceeding to decisional step 122, the queue manager 42 determines whether additional packets exist in the queue 40. If additional packets do not exist, the queue manager 42 has no additional packets to transmit and the No branch of decisional step 122 returns to the Idle state 110. If additional packets are queued, the Yes branch of decisional step 122 leads to step 124. At step 124, the queue manager 42 determines the size of a transmission token 70 for the new first packet. Step 124 returns to decisional step 114 where, as previously described, the queue manager 42 determines whether sufficient tokens 52 are available in the token bucket 50 to transmit the first packet. If sufficient tokens 52 are available, the packet is transmitted and the token bucket 50 updated as previously described.

If sufficient tokens are not available in the token bucket 50, then sufficient bandwidth is not available in the sector 12 to transmit the first packet. Accordingly, the No branch of decisional step 114 leads to decisional step 130 in which the queue manager 42 determines whether additional packets are queued and may be transmitted in the limited bandwidth that is currently available. If additional packets are not queued, then the No branch of decisional step 130 returns to decisional step 114 to determine if sufficient tokens 52 have become available due to filling of the token bucket 50 to transmit the first packet. If sufficient tokens 52 have become available, the first packet will be transmitted and the token bucket 50 updated as previously described. If sufficient tokens are still not available, the queue manager 42 will continue to check for and try to transmit additional packets until sufficient resources become available to transmit the first packet in the queue 40.

At decisional step 130, if additional packets exist in the queue 40, the Yes branch leads to step 132. At step 132, the queue manager 42 determines a size of a transmission token 70 for the next packet in the queue 40. At decisional step 134, the queue manager 42 determines whether sufficient tokens 52 are available in the token bucket 50 for transmission of the next packet in the queue 40. If sufficient tokens 52 are not available, the No branch of decisional step 134 leads to decisional step 142 where a resource change is determined.

At decisional step 134, if sufficient tokens 52 are available in the token bucket 50 to transmit the packet under consideration, the tokens 52 are allocated to the packet and the Yes branch leads to step 136. At step 136, the next packet is removed from the queue 40. Next, at step 138, the next packet is transmitted to the wireline or wireless network for delivery to a destination device. At step 140, the token bucket 50 is updated to remove tokens 52 allocated to the packet as that bandwidth and power (impact) has been used and is no longer available.

Step 140 leads to decisional step 142 in which a resource change is determined. If additional resources have become available due to bucket fill or resource release, the Yes branch of decisional step 142 returns to decisional step 114 in which the queue manager 42 continues to determine whether sufficient tokens 52 have become available in the token bucket 50 to transmit the first queued packet. The No branch of decisional step 142 returns to decisional step 130 where further packets are examined. Thus, the queue manager 42 will continue to check each packet in the queue 40 in the order in which they are queued until a packet is found for which sufficient resources are currently available for transmission. In this way, packet flows in a sector 12 are effectively policed and shaped where the packets have a varying level of impact on the physical RF layer. Thus, the specific impact of each packet is accounted for to conform the flows to specific physical layer traffic characteristics of bandwidth and power usage.

FIGS. 8A–E are a series of block diagrams illustrating management of exemplary traffic resources in accordance with one embodiment of the present invention. In this embodiment, the traffic resources are managed using the two-dimensional token bucket 50 of FIG. 3 with a static fill rate at 10 tokens 52 per unit time. Packets are only transmitted when sufficient tokens 52 are available in the token bucket 50 for the power level and duration of a transmission token 70 representing the packet.

Figure 8A:
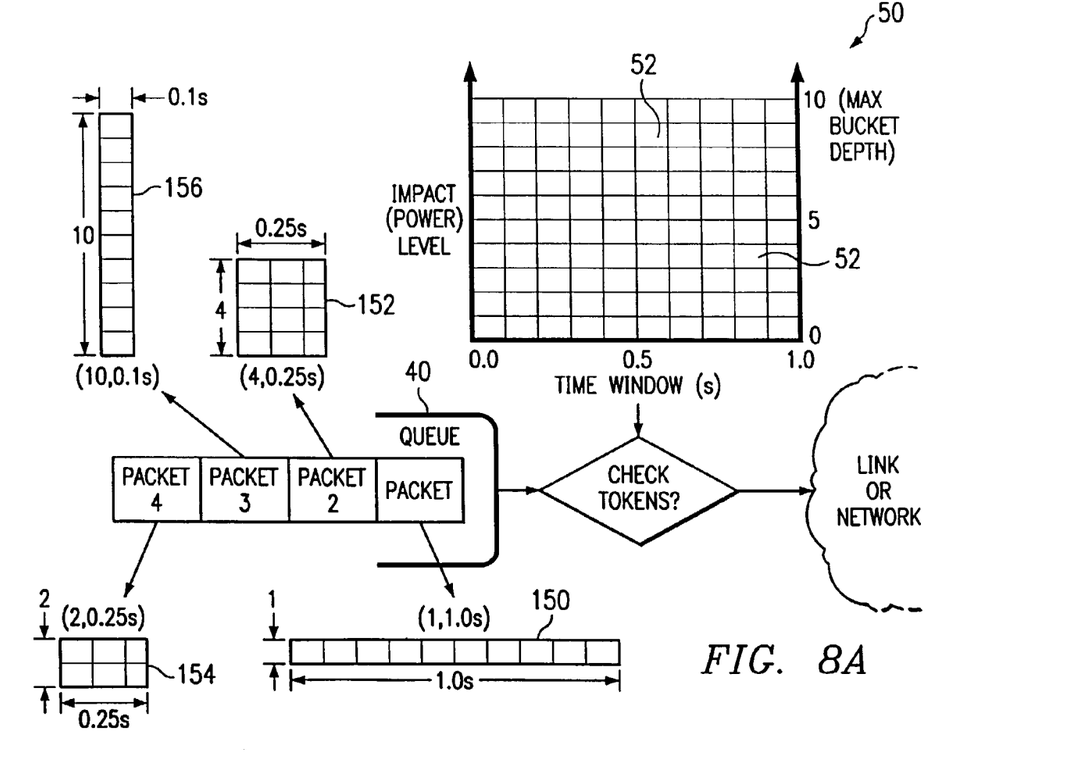
FIGS. 8A–E are a series of block diagrams illustrating check-out of exemplary packets in accordance with one embodiment of the present invention.

Referring to FIG. 8A, packet 1 has a peak rate of 1000 bytes per second using power level 1 and is thus represented by a transmission token 150 having a depth of 1 and a width of 10 0.1 seconds (1 second). Packet 2 has a peak rate of 4000 bytes per second using power level 4 and is represented by a transmission token 152 having a depth of 4 and width of 0.25 seconds. Packet 3 has a peak rate of 4000 bytes per second using power level 2 and is represented by transmission token 154 having a depth of 2 and a width of 0.25 seconds. Packet 4 has a peak rate of 10,000 bytes per second using power level 10 for 0.1 seconds and is thus represented by a transmission token 156 having a depth of 10 and a width of 0.1 seconds. Each of the packets will be transmitted in the order received so long as sufficient tokens 52 are available in the token bucket 50 to check-out the corresponding transmission token 150, 152, 154 or 156.

Figure 8B:
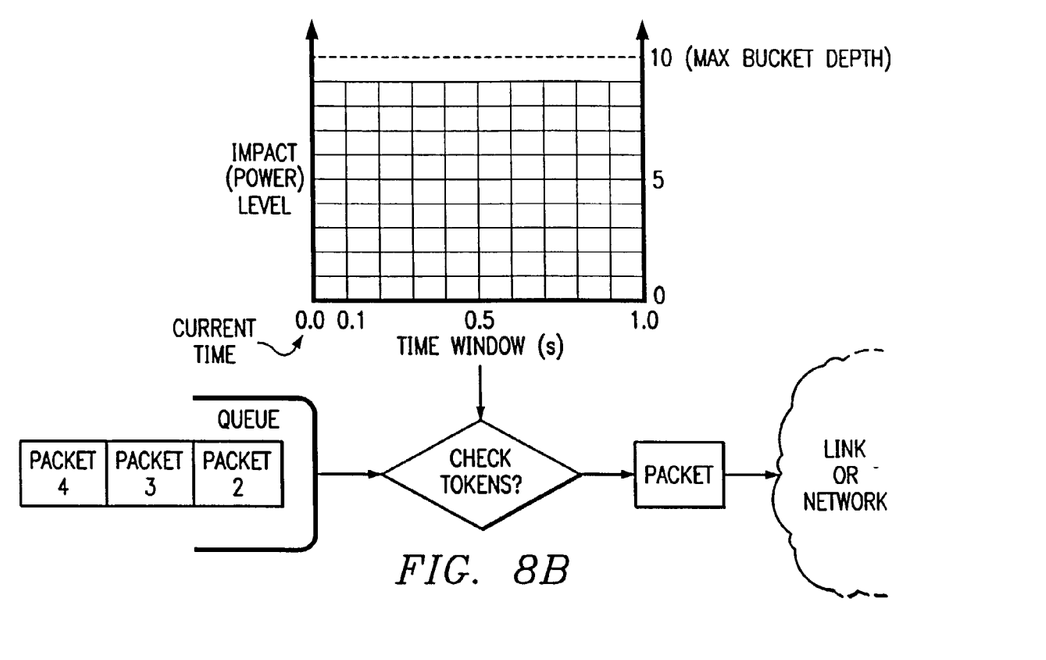

Referring to FIG. 8B, the queue manager 42 checks the two-dimensional token bucket 50 to determine if sufficient tokens 50 are available to support transmission of packet 1 as represented by transmission token 150. Half and other fractional tokens may be rounded up to a full token. Sufficient tokens are available in the bucket 50 and accordingly packet 1 is sent out to the wireless link or network and the token bucket 50 updated.

Figure 8C:
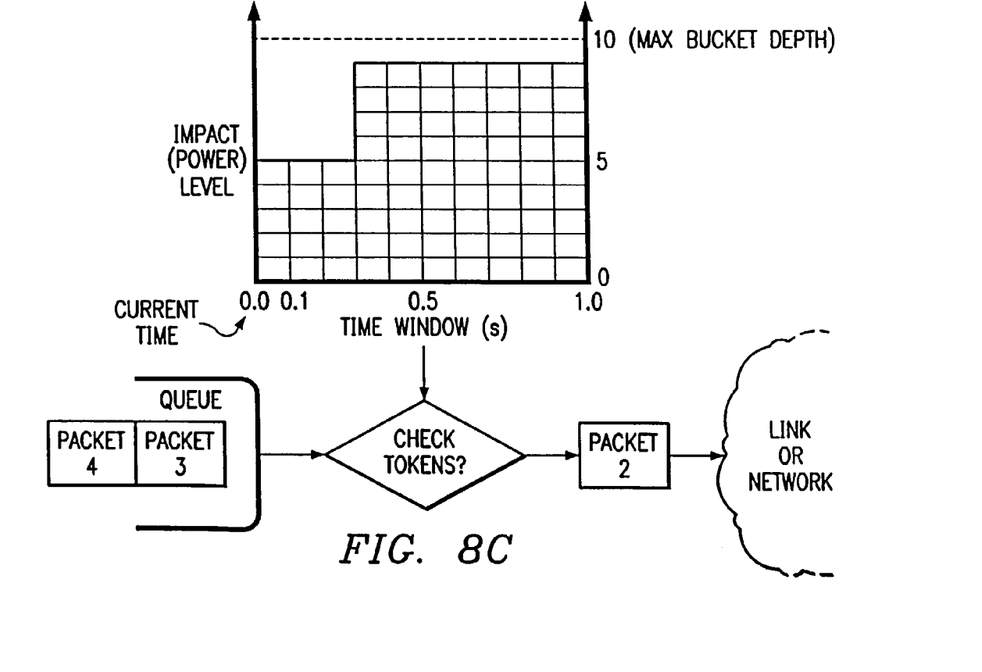

Referring to FIG. 8C, the queue manager 42 determines whether sufficient tokens 52 are available in the token bucket 50 to support transmission of packet 2, the current first packet in the queue 40, having a transmission token 152 with a power level of 4 for a duration of 0.25 seconds. Because sufficient tokens 52 are available in the bucket 50, packet 2 is sent out and the token bucket 50 updated.

Figure 8D:
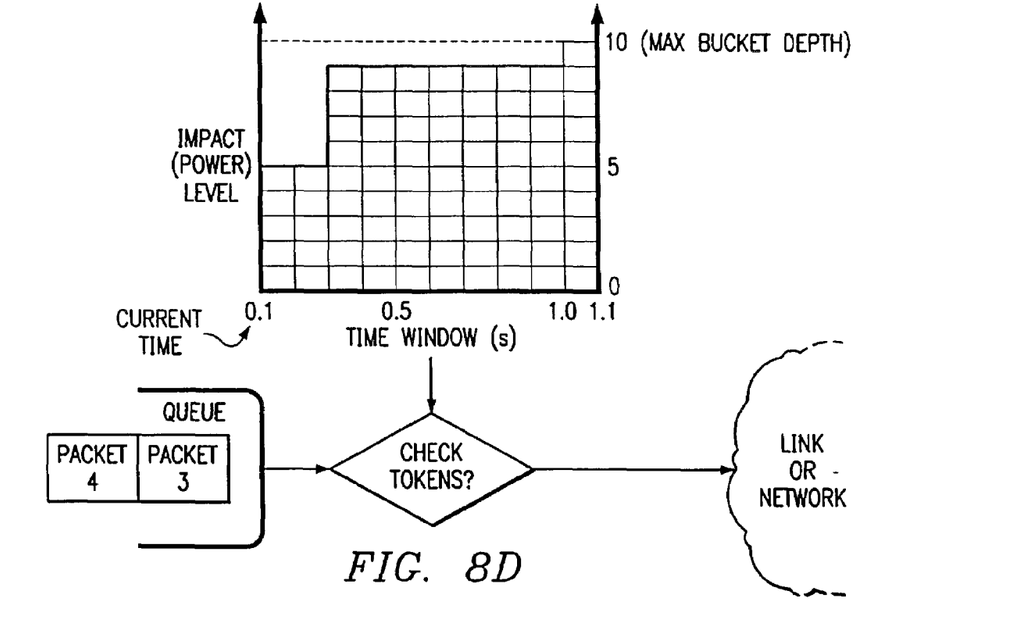

Referring to FIG. 8D, packet 3 is advanced to the front of the queue 40. The queue manager 42 determines whether sufficient tokens 52 are available in the token bucket 50 to support transmission of packet 3 as represented by a transmission token 154 having a power level 10 for 0.1 seconds. Because the necessary tokens 152 are not available, packet 3 is not sent out and remains in the queue 40. Packet 3 will be sent out from the queue 40 by the queue manager 42 when sufficient resources become available. Alternatively, transmission may be scheduled based on known token availability at a later start time in the bucket 50.

Figure 8E:
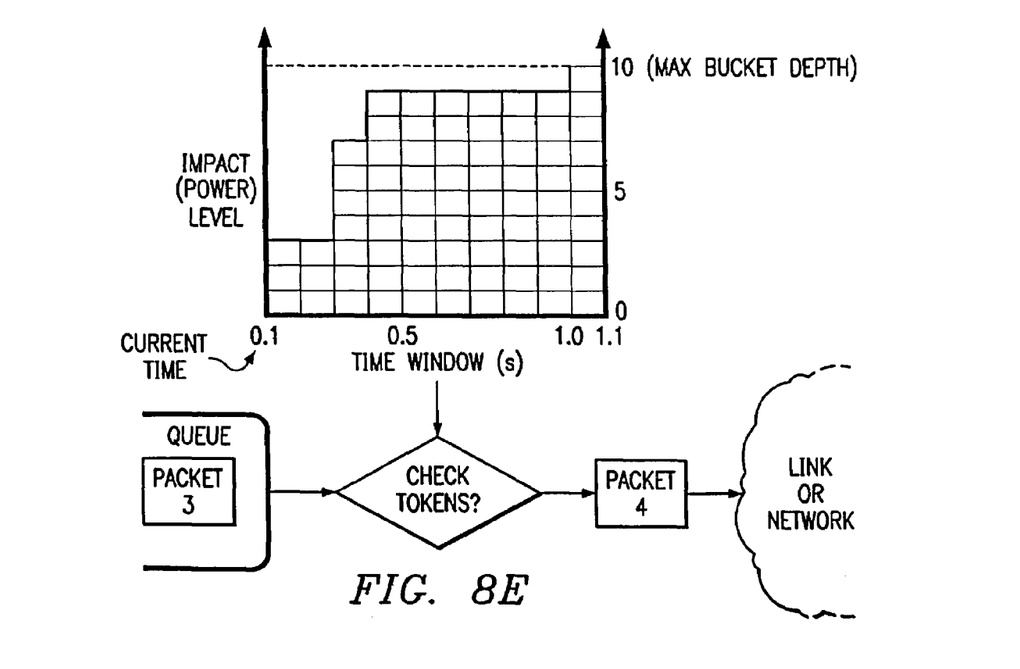

Referring to FIG. 8E, the queue manager 42 moves on to packet 4, the next packet in the queue 40, and determines whether sufficient tokens 52 are available in the token bucket 50 to support transmission of packet 4 as represented by the transmission token 156. Because sufficient tokens 52 are available, packet 4 is sent out to wireless or wireline link and the token bucket 50 updated. In this way, shared bandwidth is allocated between packet flows while insuring that the traffic characteristics do not violate bucket configuration.

In another embodiment, the ingress and egress transmission control systems 34 and 36 may each be implemented based on an allocation algorithm without use of the token buckets 44. In this embodiment, packet check-out is scheduled based on available transmission resources. The time to check-out each packet may be calculated as follows:

$$tts = ct + LI/R$$

where:
tts is the time to send the next packet;
ct is the current time;
L is the packet size;
I is the impact coefficient; and
R is the average available transmission rate.

The inclusion of the impact coefficient in the scheduling algorithm allows a full impact of packet transmission to be accounted for in managing transmission resources. The impact coefficient may be predefined for a particular flow or group of flows, dynamically based on operating conditions in the network 10, based on the transmission power or other suitable characteristic of the packet. Thus, the specific impact of each data packet on the physical layer resource of a sector 12 is taken into account in evaluating and allocating transmission resources. As a result, traffic flows are more accurately policed and shaped to account for resource limitations in the sector 12.

Figure 9:
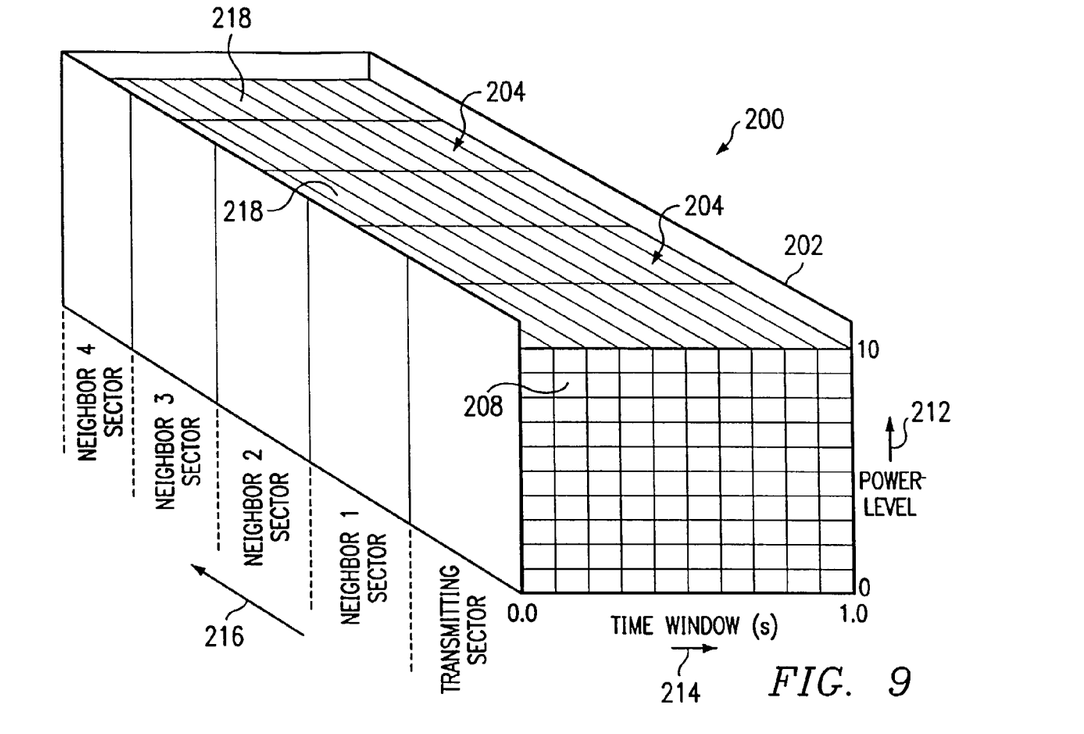
FIG. 9 is a block diagram illustrating the multiple dimension token bucket of FIG. 2 in accordance with another embodiment of the present invention.

FIG. 9 illustrates a three-dimensional token bucket 200 in accordance with one embodiment of the present invention. In this embodiment, the three-dimensional token bucket 200 comprises a two-dimensional token bucket 202 for a sector 12 in which traffic will be transmitted and a plurality of two-dimensional token buckets 204 for disparate sectors 12. The transmission sector token bucket 202 may include transmission resources for the entire sector 12 or for one of a plurality of flow groups within the sector 12. Each disparate sector token bucket 204 may comprise transmission resources for the entire sector 12 or may be a supplementary token bucket dedicated to providing transmission resources to packet transmissions in other sectors. As previously described in connection with two-dimensional token bucket 50, each two-dimensional token bucket 202 and 204 is sized based on the average data rate, burst rate, transmission power, interference characteristic or other suitable parameter of a corresponding flow or groups of flows at an associated location. The two-dimensional token buckets 202 and 204 may each have a static or dynamic fill rate.

Referring to FIG. 9, the three-dimensional token bucket 200 represents power level 212 as depth of the bucket 200, time duration 214 as width of the bucket 200, and location 216 as length of the bucket 200. Each token 218 represents impact on RF resources in a location of transmitting or receiving a packet in that or another location at one power level unit per unit time. In a particular embodiment, the power level unit is one watt, the time unit is one tenth of a second, and the location is at the sector level. It will be understood that the three-dimensional token bucket 200 may comprise other suitable units that represent the impact on transmission resources at each location in the network 10.

Figure 10:
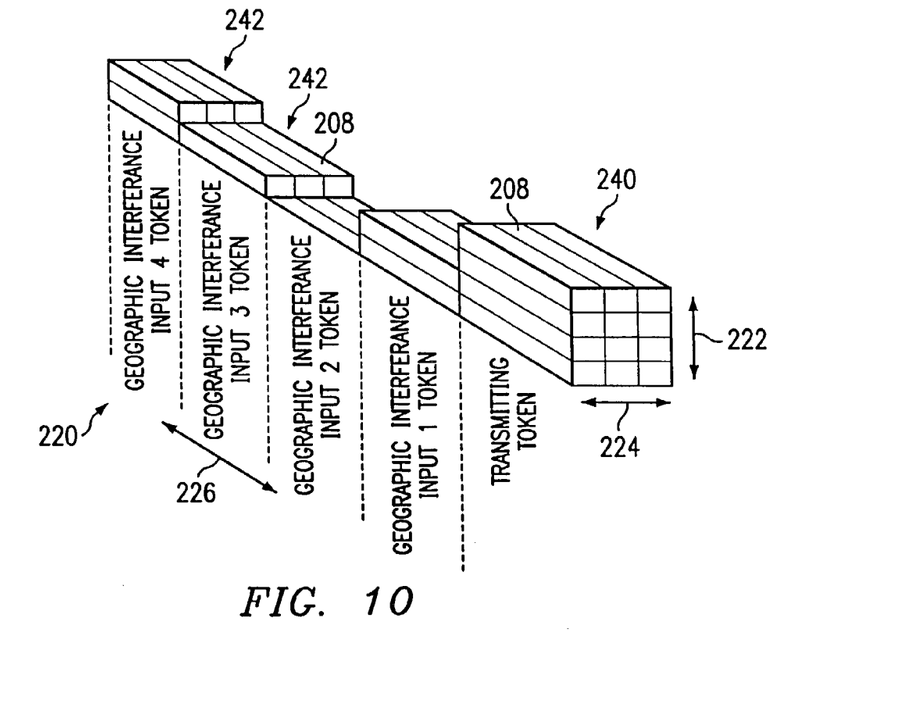
FIG. 10 is a block diagram illustrating a multiple dimension token for use in conjunction with the multiple dimension token bucket of FIG. 9 in accordance with one embodiment of the present invention.

FIG. 10 illustrates a three-dimensional transmission token 220 for packets for use in connection with the three-dimensional token bucket 200. The three-dimensional transmission token 220 comprises a token depth 222, token width 224, and token length 226 that together define a number of tokens 208 (volume of transmission token 220) needed for transmission of the corresponding packet. The token depth 222 indicates the impact power usage for transmission of the packet. The token width 224 indicates the duration of the impact. The token length 226 indicates the impact on a set of neighboring or other disparate sectors 12, which may be adjacent or all sectors 12 in the network 10.

In one embodiment, the three-dimensional transmission token 220 includes a two-dimensional transmission token 240 for the transmit sector 12 and a two-dimensional geo-location interference token 242 for each of the disparate sectors 12. The transmission token 240 represents the impact in a sector 12 of transmitting a token in the sector 12. Each of the geo-location interference token 242 represents the impact of that transmission in the associated disparate sector. Thus, the three-dimensional transmission token 220 is a network token representing the full impact on network resources of transmitting the packet, which allows the full network impact to be evaluated and necessary resources allocated.

Figures 11, 12:
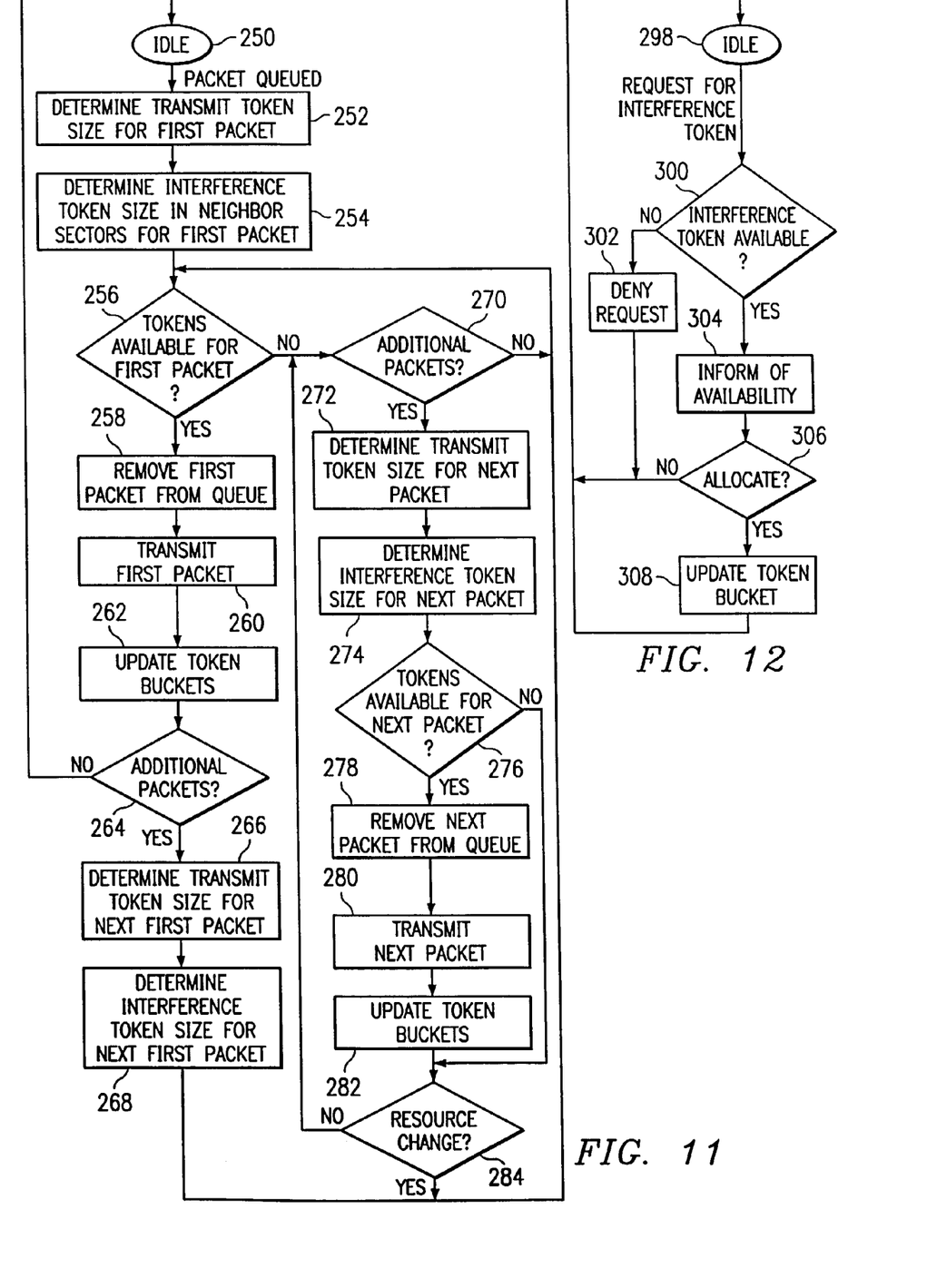
FIG. 11 is a flow diagram illustrating a method for packet check-out from the queue of FIG. 2 using the multiple dimension token and token bucket of FIGS. 9 and 10 in accordance with one embodiment of the present invention.
FIG. 12 is a flow diagram illustrating a method for communicating token availability between the queue managers of FIG. 2 in accordance with one embodiment of the present invention.

FIG. 11 is a flow diagram illustrating a method for checking-out packets from the queue 40 using the multiple dimension token bucket 44 in accordance with another embodiment of the present invention. In this embodiment, the multiple dimension token bucket 44 is the three-dimensional token bucket 200 and packets are represented by the three-dimensional transmission token 220. Packets are checked-out in the order in which they are received in accordance with available transmission resources. Thus, if available resources do not exist to transmit a first packet in the queue 40, later queued packets for which sufficient resources are available will be transmitted to maximize use of available resources.

Referring to FIG. 11, the method begins with a queue manager 42 in the Idle state 250 while the queue 40 is empty. In response to the queuing of one or more packets, the queue manager 42 transitions to step 252. At step 252, the queue manager 42 determines a size of a transmission token 240 for the first queued packet. At step 254, the queue manager 42 determines a size of a geographic interference token 242 at each neighboring sector for the first packet. Together, the transmission and geographic interference tokens form a network token indicating the full impact on network resources of transmitting the packet.

Proceeding to decisional step 256, the queue manager 42 determines whether sufficient tokens 218 are available in the token bucket 200 for transmission of the first packet based on the size of the three-dimensional transmission network token 220. In one embodiment, sufficient tokens 218 are available in the token bucket 200 when a set of tokens 218 spanning the power level are available over the duration of the transmission time in each of the two-dimensional transmit and disparate buckets 202 and 204. If sufficient tokens are available in the token buckets 202 and 204, the tokens 218 are allocated to the first packet and the Yes branch of decisional step 256 leads to step 258. At step 258, the first packet is removed from the queue 40. Next, at step 260, the first packet is transmitted to the wireless or wireline portion of the network 10 for delivery to a destination device. At step 262, the token buckets 202 and 204 are updated to remove tokens 218 allocated to the packet as that bandwidth and power (impact) has been used and is no longer available.

Proceeding to decisional step 264, the queue manager 42 determines whether additional packets exist in the queue 40. If additional packets do not exist, the queue manager 42 has no additional packets to transmit and the No branch of decisional step 264 returns to the Idle state 250. If additional packets are queued, the Yes branch of decisional step 264 leads to step 266.

At step 266, the queue manager 42 determines the size of a transmission token 240 for the new first packet. At step 268, the queue manager 42 determines a size of a geographic interference token 242 for each sector for the new first packet. Step 268 returns to decisional step 256 where, as previously described, the queue manager 42 determines whether sufficient tokens 218 are available in the token bucket 200 to transmit the first packet based on the network token formed by the transmission token 240 and the geographic interference tokens 242. If sufficient tokens 218 are available, the packet is transmitted and the token bucket 200 updated as previously described.

If sufficient tokens are not available in the token bucket 200, then sufficient transmission resources not available in one or more of the sectors 12 to transmit the packet. Accordingly, the No branch of decisional step 256 leads to decisional step 270 in which the queue manager 42 determines whether additional packets are queued and may be transmitted in the limited resources that are currently available. If additional packets are not queued, then the No branch of decisional step 270 returns to decisional step 256 to determine if sufficient tokens 218 have become available due to the filling of the token bucket 200 to transmit the first packet. If sufficient tokens 218 have become available, the first packet will be transmitted and the token bucket 200 updated as previously described. If sufficient tokens are still not available, the queue manager 42 will continue to check for and try to transmit other packets until sufficient resources become available to transmit the first packet in the queue 40.

At decisional step 270, if additional packets exist in the queue, the Yes branch leads to step 272. At step 272, the queue manager 42 determines a size of a transmission token 240 for the next packet in the queue 40. At step 274, the queue manager 42 determines a size of a geographic interference token for each of the neighboring or other sectors 12 and creates the network token for the next packet in the queue 40.

At decisional step 276, the queue manager 42 determines whether sufficient tokens 218 are available in the token bucket 200 for transmission of the next packet in the queue 40 based on the network token formed by the transmission token 240 and the geographic tokens 242. If sufficient tokens 208 are not available, the No branch of decisional step 276 leads to decisional step 284 where a resource change is determined.

At decisional step 276, if sufficient tokens 218 are available in the token bucket 200 to transmit the next packet, the tokens 218 are allocated to the next packet and the Yes branch leads to step 278. At step 278, the next packet is removed from the queue. Next, at step 280, the next packet is transmitted to the wireline or wireless network for delivery to a destination device. At step 282, the token bucket 200 is updated to remove tokens 218 allocated to the next packet as that bandwidth and power (impact) has been used is no longer available.

Step 282 leads to decisional step 284 in which a resource change is determined. If additional resources have become available due to bucket fill or resource release, the Yes branch of decisional step 284 returns to decisional step 256 in which the queue manager 42 determines whether sufficient tokens 218 have become available in the token bucket 200 to transmit the first queued packet. The No branch of decisional step 284 returns to decisional step 270 where further packets are examined. Thus, the queue manager 42 will continue to check each packet in the queue 40 in the order in which they are queued until a packet is found for which sufficient resources are currently available for transmission. In this way, packet flows in each sector are efficiently policed and shaped where the packets have a varying level of impact on the physical RF layer. Thus, the specific impact of each packet is accounted for in each sector to conform the flows to specific physical layer traffic characteristics of bandwidth and power usage.

In another embodiment of the three-dimensional system, each queue manager 42 may itself determine the availability of tokens in a corresponding token bucket. In this embodiment, each queue manager 42 will respond to a request from disparate queue managers 42 in the network 10 in order to evaluate and allocate interference resources for transmission of packets in the neighboring sectors. FIG. 12 illustrates interactions between queue managers 42 in accordance with this embodiment of the present invention.

Referring to FIG. 12, the method begins with the queue manager 42 in the idle state 298 while waiting for a request from disparate queue managers 42. In response to a request to provide a geographic interference token for packet transmission in another sector 12, the Idle state 250 transitions to decisional step 300. At decisional step 300, the queue manager 42 determines whether the sufficient tokens 218 are available for the geographic interference token 242. The geographic interference token 242 is sized based on the size of the transmission token 240 and interference between the sectors 12. Thus, the geographic interference token 242 may be a fraction of the transmission token 240 based on an intersector interference value. Alternatively, the geographic interference token 242 may be a defined portion of the transmission token 240 based on layout and access technology of the network 10. Further still, the geographic interference token 242 may an on/off state for each of the neighboring or other sectors 12. The geographic interference token 242 may be sized by the requesting queue manager 42, or sized by the responding queue manager 42 in response to the request and information on the transmission characteristics of the packet. If sufficient tokens 218 are not available, the No branch of decisional step 300 leads to step 302. At step 302, the request is denied as sufficient resources are not available. Step 302 returns to the Idle state 50. Thus, a packet will not be transmitted in the adjacent sector 12 if such transmission would cause degrading interference in the present sector 12.

Returning to decisional step 300, if sufficient tokens are available, the Yes branch leads to step 304. At step 304, the queue manager 42 informs the requesting queue manager 42 that the requested tokens 218 are available. Next, at decisional step 306, the queue manager 42 determines whether the requested tokens should be allocated based on instructions from the requesting queue manager 42. If the requesting queue manager 42 is informed that sufficient resources exist in each of the neighboring sectors 12, then it will instruct those sectors 12 to allocate the geographic impact tokens. If the tokens 218 are to be and are allocated, the Yes branch of decisional step 306 leads to step 308 in which the token bucket 200 is updated to remove the allocated tokens 218 as they will be used by transmission of a packet in another sector and are not available. Step 308 returns to the Idle state 250.

Returning to decisional step 306, if the tokens 218 are available but not allocated, the No branch returns to the Idle state 250. In this way, the queue manager 42 interacts with neighboring sectors 12 to determine whether sufficient resources are available in those sectors 12 in order to accommodate interference caused by transmission of a packet in the sector 12 and responds to request from the neighboring sectors 12 for similar information.

Figure 13:
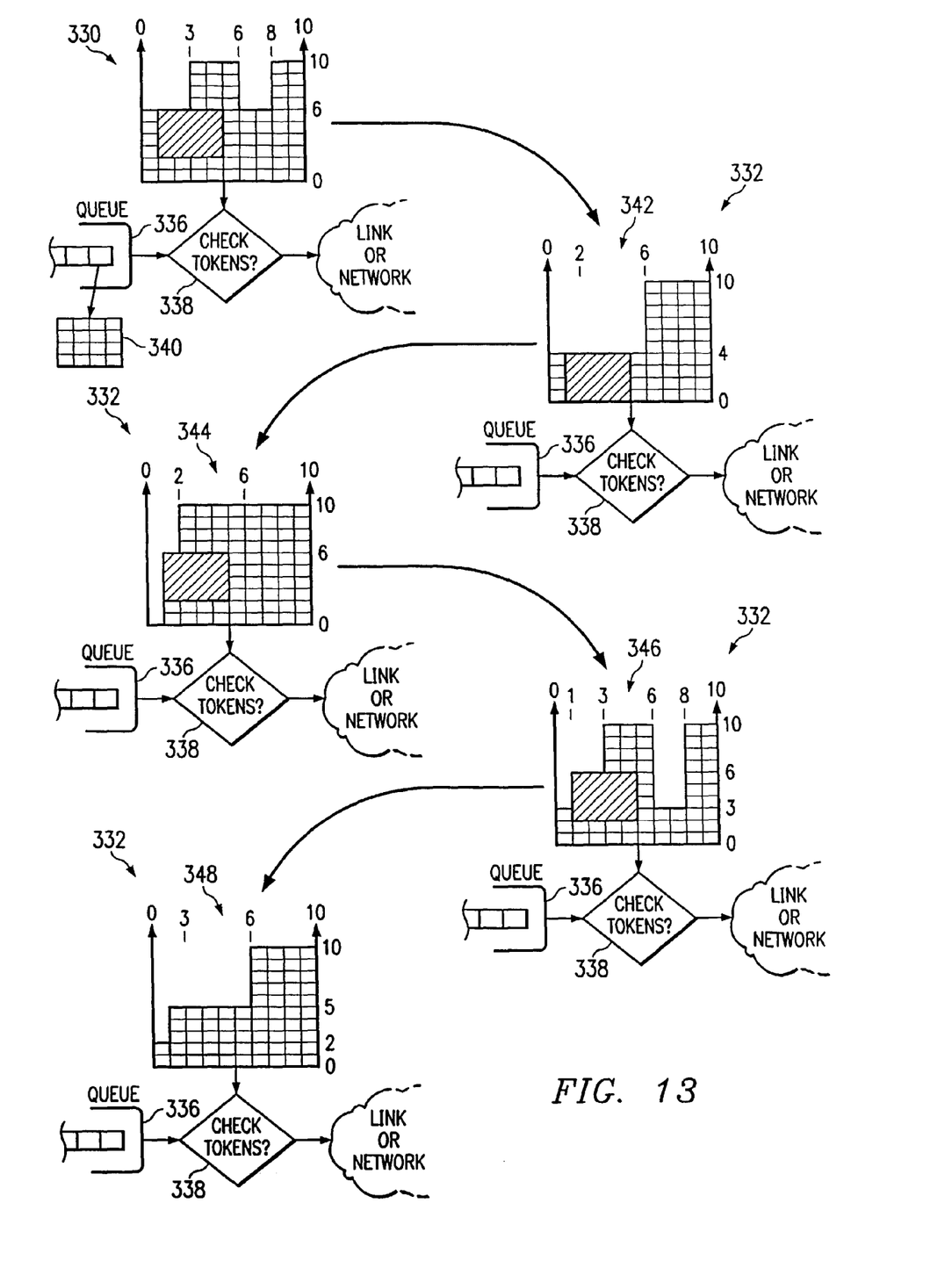
FIG. 13 is a block diagram illustrating check-out of exemplary packets in accordance with one embodiment of the present invention.

FIG. 13 is a block diagram illustrating management of exemplary traffic resources in accordance with one embodiment of the present invention. In this embodiment, three-dimensional tokens 220 including a geographic interference token 242 for each neighboring sector 12 are used to determine whether sufficient network resources are available to transmit a packet.

Referring to FIG. 13, a transmission sector 330 has a plurality of neighboring sectors 332. The neighboring sectors 332 may be adjacent, proximate to, impacted or suitable sectors 12 in the network 10. A two-dimensional token bucket 334 is used in each of the transmission sector and the neighboring sectors 330 and 332. Together, the two-dimensional token buckets 334 form a three-dimensional token bucket 200. In each of the sectors 330 and 332, a buffer 336 queues traffic and a token-check system 338 checks the traffic out of the buffer 336 when sufficient resources are available in the network 10.

In the transmission sector 330, in response to queuing of a packet having a transmission token 340 with a power level of 4 and a time duration of 0.4 seconds, the token check-out system 338 determines that sufficient resources are immediately available in the sector 12. The token check-out system 338 also checks with neighboring sectors 12 to determine if sufficient resources are available in those sectors 12 to handle the impact caused by transmission of the packet. At a first neighboring sector 342, the packet has geographic interference token 242 with a power level of 2 over the duration time, for which resources are currently available. At a second neighboring sector 344, the packet has an geographic interference token 242 with a power level of one over the duration time. Sufficient tokens are not available at the current time, but will become available in 0.1 seconds. At a third neighboring sector 346, the packet has an geographic interference token 242 with a power level of 3 over the duration time. Again, sufficient tokens are not available but will become available in 0.1 seconds. At a fourth neighboring sector 348, the packet has no interference and accordingly may be transmitted without regard to the token bucket in that sector. Because sufficient resources are not available in all of the neighboring sectors 12, the packet will not be currently transmitted, but will remain queued. Transmission of the packet may be scheduled to begin in 0.1 seconds based on the current state of the system or other packets may be immediately transmitted and transmission resources rechecked at a later time for the packet.

In another embodiment, the three-dimensional resource allocation system may be deployed without the three-dimensional token bucket 200. In this embodiment, packet check-out may be scheduled based on available resources and resource impact. The radio resource impact in a sector may be calculated as follows:

$$\text{impact}_i = I_i / R_1$$

where:
I is the impact coefficient in the sector; and
$R_1$ is the average available transmission rate in the transmission sector; and
i is the sector.

In another embodiment, the radio resource impact in a sector may be calculated as follows:

$$impact_i = \max_i (I_i / R_i)$$

where:
I is the impact coefficient in the sector;
$R_i$ is the available transmission rate in the sector; and
i is the sector.

The time to check-out each packet may then be calculated based on the impact as follows:

$$tts_1 = ct + L(\text{impact}_i)$$

$$tts_2 = ct + L(\text{impact}_i)$$

$$tts_n = ct + L(\text{impact}_i)$$

where:
tts is the time to send the next packet for a sector;
ct is the current time;
L is the packet size; and
i is the sector.

As previously described in connection with the two-dimensional system, inclusion of the impact coefficient in the scheduling algorithm allows the full impact of packet transmission to be accounted for in managing transmission resources in a sector. The impact coefficient may be independently varied depending on the interference caused in the sector by packet transmission in another sector. The impact coefficient may be static based on the layout of the sectors 12 or dynamic based on operating conditions of the network 10. Thus, the specific impact of each data packet on the physical layer resource in the network is taken into account in evaluating and allocating transmission resources. As a result, traffic flows are more accurately policed and shaped to account for resource limitations in the wireless network 10. In addition, because the available bandwidth may be accurately determined, it may be brokered as described in co-owned U.S. patent application Method and System for Brokering Bandwidth in a Wireless Communications Network previously incorporated by reference.

Although the present invention has been described with several embodiments, various changes and modifications may be suggested to one skilled in the art. It is intended that the present invention encompass such changes and modifications as fall within the scope of the appended claims.

What is claimed is:

1. A method for managing transmission resources in a wireless communications network, comprising:
   receiving a plurality of packets; and
   for each packet:
      determining a time duration for transmission of the packet;
      determining a power level for transmission of the packet over the time duration;
      determining a wireless resource impact for transmission of the packet based on the time duration and the power level determined for the packet, wherein the wireless resource impact is a sector impact representing the impact of transmitting the packet in a sector of the wireless network; and
      allocating transmission resources to the packet based on the wireless resource impact.

2. The method of claim 1, further comprising:
   determining a geographic interference impact of transmitting the packet in the sector for each disparate sector of one or more disparate sectors based on the sector impact;
   determining a network impact based on the sector impact and the geographic interference impact; and
   allocating transmission resources to the packet based on the network impact.

3. The method of claim 2, wherein the wireless communications network comprises a cellular network, the sector comprises a cell site of the cellular network, and the disparate sector comprises one of an adjacent or co-channel cell site of the cellular network.

4. The method of claim 2, further comprising updating available resources in the wireless network based on the network impact of each packet.

5. A system for managing transmission resources in a wireless communications network, comprising:
   a queue to store a plurality of packets; and
   a queue manager operable, for each packet, to determine a time duration for transmission of the packet, to determine a power level for transmission of the packet over the time duration, to determine a wireless resource impact for transmission of the packet based on the time duration and the power level determined for the packet, wherein the wireless resource impact is a sector impact representing the impact of transmitting the packet in a sector of the wireless network, and to check-out the packet from the queue based on availability of transmission resources.

6. The system of claim 5, the queue manager further, for each packet, to determine a geographic interference impact of transmitting the packet in the sector for each disparate sector of or more disparate sectors based on the sector impact, to determine a network impact based on the sector impact and the geographic interference impact, and to allocate transmission resources to the packet based on the network impact.

7. The system of claim 6, the queue manager further to update available resources in the wireless network based on the network impact of each packet.

8. The system of claim 6, wherein the wireless communications network comprises a cellular network, the sector comprises a cell site of the cellular network, and the disparate sector comprises one of an adjacent or co-channel cell site of the cellular network.

9. The system of claim 5, further comprising:
   software stored in a computer-readable medium; and
   the software comprising the queue manager.

10. The system of claim 5, further comprising an application specific integrated circuit (ASIC) comprising the queue manager.

11. The system of claim 5, further comprising a field programmable gate array (FPGA) comprising the queue manager.

12. A method for managing transmission resources in a wireless communications network, comprising:
    receiving a plurality of data packets;
    characterizing each data packet based on a rate of packet transmission, a power of packet transmission, and an interference impact at each of a plurality of locations caused by transmission of the packet; and
    allocating transmission resources to each data packet based on the characterization of each data packet.

13. A system for managing transmission resources in a wireless communications network, comprising:
    computer implementable instructions encoded in at least one computer processable medium; and
    the instructions, upon processing to receive a plurality of data packets, to characterize each data packet based on a rate of packet transmission, a power of the packet transmission, and an interference impact at each of a plurality of locations caused by transmission of the packet, and to allocate transmission resources to each data packet based on the characterization of each data packet.

14. The system of claim 13, wherein the computer implementable instructions comprise software stored on a computer-readable medium.

15. The system of claim 13, wherein the computer implementable instructions comprise instructions encoded in a specialized processor.

16. The system of claim 15, wherein the specialized processor comprises a field programmable gate array (FPGA).

17. The system of claim 15, wherein the specialized processor comprises an application specific integrated circuit (ASIC).

18. A transmission control system, comprising:
    computer implementable instructions encoded in at least one computer processable medium; and
    the instructions, upon processing to allocate resources in a wireless network based on a multiple dimension token, the multiple dimension token comprising a first dimension representing a time duration for transmission of a packet and a second dimension representing a power level for transmission of the packet over the time duration.

19. The system of claim 18, wherein the token further comprises a third dimension representing disparate locations in the wireless network, the multiple dimension token representing an impact of transmitting the token on each of the locations.

20. The system of claim 19, wherein the locations include a transmission sector in which the packet is to be transmitted in a plurality of disparate sectors proximate to the transmission sector.

21. The system of claim 20, wherein the size of the multiple dimension token in the third dimension for each of the disparate sectors is a function of the size of the token in the transmission sector.

22. The system of claim 21, wherein the sectors are each a cell site of a cellular network.

* * * * *